United States Patent
Buschman

(10) Patent No.: US 11,168,232 B2
(45) Date of Patent: Nov. 9, 2021

(54) METHODS OF INSTALLING TILE USING A REACTIVATABLE TILE BONDING MAT

(71) Applicant: Ardex Group GmbH, Witten (DE)

(72) Inventor: Bryant Buschman, St. Augustine, FL (US)

(73) Assignee: Ardex Group GmbH, Witten (DE)

( * ) Notice: Subject to any disclaimer, the term of this patent is extended or adjusted under 35 U.S.C. 154(b) by 0 days.

(21) Appl. No.: 16/276,528

(22) Filed: Feb. 14, 2019

(65) Prior Publication Data

US 2019/0264450 A1 Aug. 29, 2019

Related U.S. Application Data

(60) Provisional application No. 62/634,724, filed on Feb. 23, 2018, provisional application No. 62/634,711, filed on Feb. 23, 2018.

(51) Int. Cl.
*C09J 7/35* (2018.01)
*C08K 3/013* (2018.01)
(Continued)

(52) U.S. Cl.
CPC .................. *C09J 7/35* (2018.01); *B29C 70/58* (2013.01); *B32B 27/36* (2013.01); *C08K 3/013* (2018.01);
(Continued)

(58) Field of Classification Search
CPC ..... C09J 7/35; C09J 7/10; C09J 167/02; C09J 2400/14; C09J 2400/16; C09J 2467/00;
(Continued)

(56) References Cited

U.S. PATENT DOCUMENTS

| 1,986,999 A | 1/1935 | Burgess |
| 3,447,955 A | 6/1969 | Wittenwyler et al. |
| (Continued) | | |

FOREIGN PATENT DOCUMENTS

| DE | 2035199 A1 | 1/1972 |
| DE | 2650160 | 5/1978 |
| (Continued) | | |

OTHER PUBLICATIONS

Machine translation of foreign reference EP3002387, obtained from https://patentscope.wipo.int/search/en/detail.jsf?docId=EP160970099&tab=PCTDESCRIPTION&_cid=P12-K42ZGT-68390-1 (last accessed on Dec. 13, 2019) (Year: 2019).*

(Continued)

*Primary Examiner* — Theodore V Adamos
(74) *Attorney, Agent, or Firm* — Carr & Ferrell LLP

(57) ABSTRACT

Exemplary methods for installing tile using a reactivatable tile bonding mat is disclosed. The reactivatable tile bonding mat is placed upon a substantially flat surface. Stone, porcelain or ceramic tile is placed and arranged on the reactivatable tile bonding mat in an aesthetically pleasing fashion, in some cases aided by the use of spacers in the joints between the sides of the tiles. Induction, or some other method of heat, is applied to the upper surfaces of the tiles, to quickly transfer through the tile, causing a polymer hot-melt material embedded in the reactivatable tile bonding mat to melt and adhere to a lower surface of the tiles, forming a strong bond. Upon the tiles fully bonding to the reactivatable tile bonding mat, spacers may be removed and a suitable grout may be applied in the joints between the sides of the tiles.

15 Claims, 2 Drawing Sheets

(51) Int. Cl.

| | | |
|---|---|---|
| *C09J 7/10* | (2018.01) | |
| *B29C 70/58* | (2006.01) | |
| *B32B 27/36* | (2006.01) | |
| *C08K 3/40* | (2006.01) | |
| *C09J 167/02* | (2006.01) | |
| *E04F 15/08* | (2006.01) | |
| *B29K 67/00* | (2006.01) | |
| *B29K 505/12* | (2006.01) | |
| *B29K 509/08* | (2006.01) | |
| *C08K 3/08* | (2006.01) | |
| *E04F 15/02* | (2006.01) | |

(52) U.S. Cl.
CPC .............. *C08K 3/40* (2013.01); *C09J 7/10* (2018.01); *C09J 167/02* (2013.01); *E04F 15/08* (2013.01); *B29K 2067/003* (2013.01); *B29K 2505/12* (2013.01); *B29K 2509/08* (2013.01); *B32B 2405/00* (2013.01); *B32B 2471/04* (2013.01); *C08K 2003/0856* (2013.01); *C08K 2201/001* (2013.01); *C09J 2400/14* (2013.01); *C09J 2400/16* (2013.01); *C09J 2467/00* (2013.01); *E04F 15/02155* (2013.01); *E04F 2290/04* (2013.01)

(58) Field of Classification Search
CPC .. C08K 3/013; C08K 3/40; C08K 2003/0856; C08K 2201/001; B29C 70/58; B32B 27/36; B32B 2405/00; B32B 2471/04; E04F 15/18; E04F 15/02155; E04F 2290/04; B29K 2067/003; B29K 2505/12; B29K 2509/08
See application file for complete search history.

(56) References Cited

U.S. PATENT DOCUMENTS

| | | | |
|---|---|---|---|
| 3,716,304 A | 2/1973 | Coles | |
| 3,725,088 A | 4/1973 | Penno et al. | |
| 3,802,790 A | 4/1974 | Blackburn | |
| 3,981,834 A | 9/1976 | Kern et al. | |
| 4,374,884 A * | 2/1983 | Kwok | C09J 121/02 428/95 |
| 4,477,636 A * | 10/1984 | Muroi | C08G 63/52 156/332 |
| 4,485,137 A | 11/1984 | White | |
| 4,792,234 A | 12/1988 | Doherty | |
| 4,923,733 A | 5/1990 | Herbst | |
| 4,953,341 A * | 9/1990 | Joos | E01C 5/006 33/404 |
| 5,052,161 A | 10/1991 | Whitacre | |
| 5,520,862 A | 5/1996 | Face, Jr. et al. | |
| 5,549,956 A | 8/1996 | Handwerker | |
| 5,566,522 A | 10/1996 | Ålander et al. | |
| 5,572,842 A | 11/1996 | Stief et al. | |
| 5,619,832 A | 4/1997 | Myrvold | |
| 5,660,465 A | 8/1997 | Mason | |
| 5,780,367 A | 7/1998 | Handwerker | |
| 5,851,618 A * | 12/1998 | Liddell | E04F 15/12 428/41.8 |
| 5,855,978 A | 1/1999 | Handwerker | |
| 5,956,921 A | 9/1999 | Fleck et al. | |
| 6,033,757 A | 3/2000 | Murphy | |
| 6,187,386 B1 | 2/2001 | Hundley | |
| 6,261,394 B1 * | 7/2001 | Raineri | B32B 7/06 156/63 |
| 6,354,058 B1 * | 3/2002 | Lewis | E04F 21/0092 254/104 |
| 6,434,901 B1 | 8/2002 | Schlüter | |
| 6,780,369 B1 | 8/2004 | Darrow et al. | |
| 6,783,007 B2 | 8/2004 | Arbore | |
| 6,803,100 B1 * | 10/2004 | Hintz | C09J 139/00 428/350 |
| 6,898,917 B2 | 5/2005 | Durning et al. | |
| 7,219,479 B2 | 5/2007 | Durning et al. | |
| 7,488,523 B1 | 2/2009 | Muncaster et al. | |
| 7,516,558 B2 * | 4/2009 | Frank | E04F 21/0092 33/518 |
| 7,963,082 B1 | 6/2011 | Bauer | |
| 8,060,956 B2 | 11/2011 | DeGooyer | |
| 8,112,827 B2 | 2/2012 | DeGooyer et al. | |
| 8,220,344 B2 | 7/2012 | Turpin, Jr. | |
| 8,230,535 B2 | 7/2012 | Kik, Sr. et al. | |
| 8,327,602 B2 | 12/2012 | Smith | |
| 8,695,300 B2 | 4/2014 | Hartl | |
| 8,857,130 B1 | 10/2014 | Newbrough et al. | |
| 8,918,926 B1 | 12/2014 | Herring | |
| 8,925,123 B2 | 1/2015 | DeGooyer et al. | |
| 9,016,018 B2 | 4/2015 | Boyle | |
| 9,771,713 B2 | 9/2017 | DeJesus et al. | |
| 2003/0202418 A1 | 10/2003 | Scartezina | |
| 2005/0219941 A1 | 10/2005 | Christenson et al. | |
| 2006/0080935 A1 | 4/2006 | Ddamulira et al. | |
| 2006/0156663 A1 * | 7/2006 | Mao | B32B 3/30 52/403.1 |
| 2006/0207213 A1 | 9/2006 | Lindgren et al. | |
| 2007/0029309 A1 * | 2/2007 | Keite-Telgenbuscher | B60R 1/0602 219/549 |
| 2007/0214743 A1 | 9/2007 | Alvarez | |
| 2008/0054519 A1 | 3/2008 | McDonald et al. | |
| 2008/0087199 A1 | 4/2008 | Gartner | |
| 2008/0141603 A1 * | 6/2008 | Harvey | E04F 15/18 52/315 |
| 2009/0241453 A1 | 10/2009 | Dellinger et al. | |
| 2010/0038818 A1 | 2/2010 | McDonald | |
| 2010/0154333 A1 * | 6/2010 | Peek | C09J 5/00 52/232 |
| 2010/0223872 A1 * | 9/2010 | Taylor | E04F 13/0887 52/309.3 |
| 2010/0272943 A1 * | 10/2010 | Ddamulira | C09J 7/10 428/41.8 |
| 2010/0285246 A1 * | 11/2010 | Becker | C08F 210/06 428/17 |
| 2010/0290216 A1 * | 11/2010 | Kotulla | B44C 3/123 362/153 |
| 2010/0320130 A1 | 12/2010 | Meyers | |
| 2011/0015306 A1 | 1/2011 | Turpin, Jr. | |
| 2011/0061334 A1 | 3/2011 | Smith | |
| 2011/0154772 A1 * | 6/2011 | Lontchar | C08G 18/4825 52/745.05 |
| 2011/0214798 A1 * | 9/2011 | Tracy | C09J 7/22 156/71 |
| 2011/0302855 A1 * | 12/2011 | D'Agostino | E04F 15/08 52/173.1 |
| 2011/0305908 A1 * | 12/2011 | D'Agostino | E04F 15/08 428/423.1 |
| 2012/0009864 A1 * | 1/2012 | Shen | E04F 17/04 454/357 |
| 2012/0076969 A1 | 3/2012 | Ponomarev et al. | |
| 2012/0097072 A1 | 4/2012 | Turpin, Jr. et al. | |
| 2012/0202057 A1 * | 8/2012 | Moro | C08F 255/04 428/344 |
| 2013/0011609 A1 | 1/2013 | Comitale et al. | |
| 2013/0029142 A1 | 1/2013 | Hoffmann et al. | |
| 2013/0047538 A1 * | 2/2013 | Taylor | C09J 7/38 52/309.3 |
| 2013/0125501 A1 | 5/2013 | Smith | |
| 2013/0284364 A1 * | 10/2013 | Couturier | C04B 26/16 156/307.1 |
| 2014/0079889 A1 | 3/2014 | Christidis et al. | |
| 2014/0141204 A1 * | 5/2014 | Calkins | B32B 5/245 428/172 |
| 2014/0154478 A1 * | 6/2014 | Fellinger | C09J 7/21 428/195.1 |
| 2015/0210042 A1 * | 7/2015 | Tapio | B32B 27/365 428/337 |

(56) References Cited

U.S. PATENT DOCUMENTS

| | | | |
|---|---|---|---|
| 2016/0032166 A1* | 2/2016 | Zhang | C09J 11/04 |
| | | | 428/220 |
| 2016/0053497 A1* | 2/2016 | Chang | B32B 5/022 |
| | | | 428/41.8 |
| 2016/0123018 A1* | 5/2016 | Wise | E04F 15/10 |
| | | | 52/747.11 |
| 2017/0101552 A1* | 4/2017 | Doe | B32B 15/20 |
| 2018/0179418 A1* | 6/2018 | Gossi | C09J 5/06 |
| 2018/0354230 A1* | 12/2018 | Zhao | B32B 7/06 |
| 2019/0264066 A1 | 8/2019 | Buschman | |
| 2019/0292794 A1* | 9/2019 | Zhao | E04F 15/107 |

FOREIGN PATENT DOCUMENTS

| | | | | |
|---|---|---|---|---|
| EP | 3002387 A1 * | 4/2016 | | C09D 5/002 |
| ES | 2227248 T3 | 4/2005 | | |
| WO | WO2010030060 A1 | 3/2010 | | |
| WO | WO-2016139278 A1 * | 9/2016 | | C09J 5/06 |

OTHER PUBLICATIONS

Meier Gluing Solutions, Full Information on Thermoplastic Hot-Melt Adhesives, (Apr. 22, 2015) obtained from https://web.archive.org/web/20150422054446/https://www.meler.eu/support/adhesives/thermoplastic/ (last accessed on Dec. 21, 2020) (Year : 2015).*

Allen, "Self-Leveling Underlayment and Bonded Topping Two-Course Slab Construction," Mar. 2011, retrieved from http://www.abwconstruction.net/case_studies/Swedish_Case_Study.pdf, retrieved Jul. 7, 2015; 25 pages.

Harrison et al., "Guide for Concrete Slabs that Receive Moisture-Sensitive Flooring Materials" 2006, retrieved from https://web.archive.org/web/20130621083220/http://www.greenbuildermag.com/GBM/media/Images/VISION%20House%20Orlando/VISION%20House%20Los%20Angeles/MJD-Concrete---ACI-302-2R_06.pdf; retrieved Jul. 7, 2015; 42 pages.

Schluter Systems L.P., "Floor Drains," [online], Oct. 2013, [retrieved on Oct. 14, 2020], Retrieved from the Internet: <URL: https://resources.schluten.com/media/psi/Schluter%20Drain%20Data%20Sheet%20Including%20Line%20Drains%20-%20553873.pdf>, 16 pages.

"Extended European Search Report", European Patent Application No. 19158933.2, dated Jun. 18, 2019, 12 pages.

"Office Action", European Patent Application No. 19158933.2, Sep. 25, 2020, 5 pages.

"Office Action", European Patent Application No. 19158933.2, dated Jul. 29, 2021, 4 pages.

* cited by examiner

METHODS OF INSTALLING TILE USING A REACTIVATABLE TILE BONDING MAT

CROSS REFERENCE TO RELATED APPLICATIONS

The present application claims the priority benefit of U.S. Provisional Patent Application Ser. No. 62/634,711, filed on Feb. 23, 2018, titled "Methods of Installing Tile Using a Reactivatable Tile Bonding Mat," and claims the priority benefit of U.S. Provisional Application No. 62/634,724, filed on Feb. 23, 2018, titled "Reactivatable Tile Bonding Mat," the subject matter of the aforementioned applications are incorporated herein by reference for all purposes. The present application is also related to U.S. Non-Provisional patent application Ser. No. 16/276,518 filed on Feb. 14, 2019, titled "Reactivatable Tile Bonding Mat," which is hereby incorporated by reference in its entirety.

FIELD OF THE TECHNOLOGY

Embodiments of the disclosure relate to methods for installing and removing, replacing or rearranging tile and stone.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided herein are exemplary methods of installing tile or stone using a reactivatable tile bonding mat, including placing the reactivatable tile bonding mat on a flat surface, placing the tile or stone on the reactivatable tile bonding mat, applying heat to the tile or stone on the reactivatable tile bonding mat, and applying grout in the joints between sides of the tile or stone.

Further exemplary methods include applying spacers in the joints between the sides of the tile or stone prior to the applying of the heat. In addition, methods may include removing the spacers in the joints between the sides of the tile or stone prior to the applying of the grout. Many exemplary methods do not use cement-based thinset.

The heating of the mat includes in various exemplary methods a heat receptor such as metal flake or fiber, powdered steel or a steel screen mesh, embedded in a hot melt. The heating may stir up molecules involving a metal screen that causes an adhesive to melt and bond to a floor and the tile. Additionally, polyethylene terephthalate ("PET") plastic may be the base for the Tile Bonding Mat. The polyethylene terephthalate ("PET") plastic can act as a heat regulator or stabilizer.

In many exemplary embodiments, windshield glass or other forms of crushed glass filler can be a component of the polyethylene terephthalate ("PET") plastic mix, and it can be added to act as a filler to the PET material. The polyethylene terephthalate ("PET") plastic comprises approximately 20-50% of the PET and 50-80% by volume of the glass material. In other embodiments, the polyethylene terephthalate ("PET") plastic comprises approximately 20-30%, 31-40%, or 41-50% of the PET and 50-60%, 61-70%, or 71-80% by volume of the glass material. One or more of these ranges or sub ranges may be selected in order to establish an efficient manner for controlling the melting process (e.g. of the PET plastic) to avoid such situations as excessive melting of the plastic into a runny liquid state.

The glass filler, in various exemplary embodiments, may be comprised of recycled windshield glass. In other exemplary embodiments, the glass filler may be comprised of any type of clean, recycled and/or non-recycled ground glass fill.

Further exemplary methods may include applying convection heat to adhere the tile to a surface. Additionally, the polyethylene terephthalate ("PET") plastic blend may be installed in grout lines of the tile, and convection heat or an industrial heat gun may be used in the installation of the polyethylene terephthalate ("PET") plastic blend in the grout lines of the tile.

Other exemplary methods include replacing, removing or rearranging tile or stone using a reactivatable tile bonding mat by removing grout between sides of the tile or stone, applying heat to the tile or stone on the reactivatable tile bonding mat, replacing, removing or rearranging the tile or stone on the reactivatable tile bonding mat, applying heat to altered tile or stone on the reactivatable tile bonding mat, and applying grout between sides of the tile or stone.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

The Tiles are widely used for wall and floor coverings. Tiles can be made of ceramic, glass, porcelain, concrete, stone, and various composite materials. Currently cement-based thinset is used to adhere the tiles cover surfaces, such floors and walls. However, the use of the cement-based thinset for tile installation has disadvantages. First, it makes it hard to remove or replace tile after the tile is glued to a surface. Second, production of the cement used in cement-based thinset is not environmentally friendly because it involves extensive emission of carbon dioxide. Third, it is a time consuming process.

Disclosed herein are exemplary methods for installing tile using a reactivatable tile bonding mat. The reactivatable tile bonding mat is placed upon a substantially flat surface. Stone, porcelain or ceramic tile is placed and arranged on the reactivatable tile bonding mat in an aesthetically pleasing fashion, in some cases aided by the use of spacers between the sides of the tiles. Induction, or some other method of heat, is applied to the upper surfaces of the tiles, to quickly transfer through the tile, causing a polymer hot-melt material embedded in the reactivatable tile bonding mat to melt and adhere to a lower surface of the tiles, forming a strong bond. Upon the tiles fully bonding to the reactivatable tile bonding mat, spacers may be removed and a suitable grout may be applied between the sides of the tiles. Due to the polymer hot-melt material being reactivatable, a subsequent application of induction or other heat to the upper surface of the tiles will soften the surface of the bonding mat under the tiles so the tiles may be removed or rearranged upon the reactivatable tile bonding mat. This process can be conducted numerous times with no deterioration of the performance.

Figure 1:
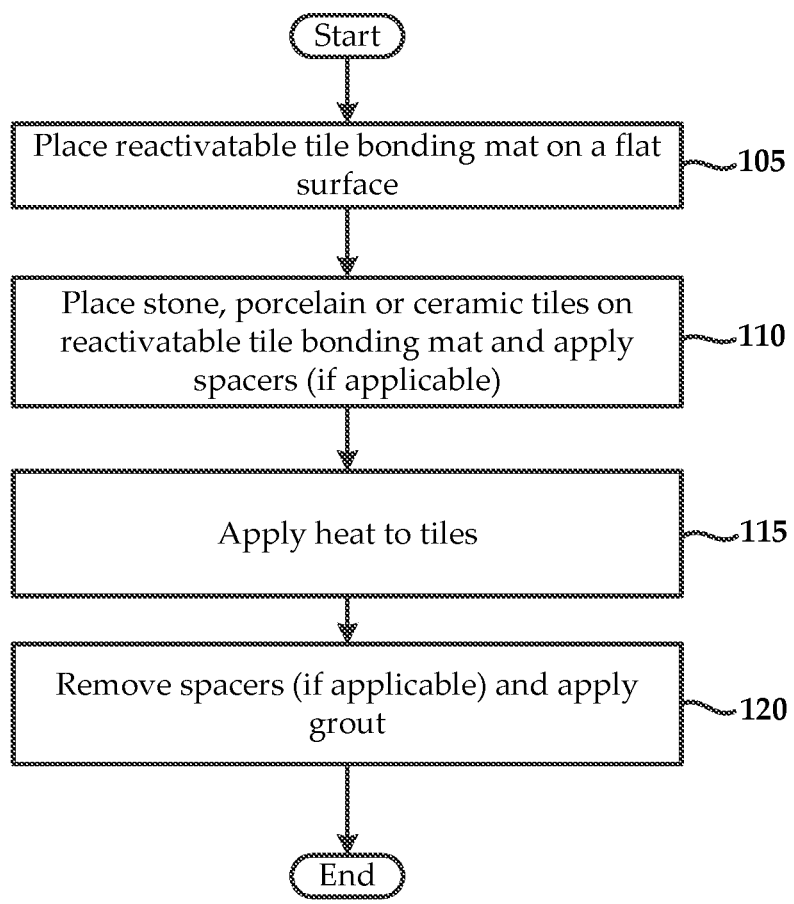
FIG. 1 illustrates an exemplary method for installing tile or stone using a reactivatable tile bonding mat.

FIG. 1 illustrates an exemplary method for installing tile or stone using a reactivatable tile bonding mat.

At step 105, the reactivatable tile bonding mat is placed upon a substantially flat surface. In some cases, the surface is horizontally or vertically oriented.

According to many exemplary embodiments, the reactivatable tile bonding mat requires no cement-based thin-set for installation. In some instances, the reactivatable tile bonding mat has adhesive and abhesive properties on a top surface and on a bottom surface. The top surface and the bottom surface include a polymer hot-melt material that is reactivatable after heating, with the adhesive and abhesive properties to concrete and other substrates being activated after heating.

In various embodiments, the reactivatable tile bonding mat with adhesive and abhesive properties is filled with calcium carbonate, oragonite, silica, metal flake, glass and the like.

In some embodiments, the reactivatable tile bonding mat with adhesive and abhesive properties includes hydrophobic material, the hydrophobic material making the tile bonding mat act as a moisture resistant membrane. In some embodiments, the mat can also act as a crack suppressant membrane.

At step 110, stone, porcelain or ceramic tile is placed and arranged on the reactivatable tile bonding mat in an aesthetically pleasing fashion, in some cases aided by the use of spacers between the sides of the tiles.

At step 115, induction, or some other method of heat, is applied to the upper surfaces of the tiles, to quickly transfer through the tile, causing a polymer hot-melt material embedded in the reactivatable tile bonding mat to melt and adhere to a lower surface of the tiles, forming a strong bond.

In some embodiments, when relying on induction heating, the mat includes a heat receptor such as metal flake or fiber, powdered steel or a steel screen mesh, embedded in the hot melt.

In other embodiments, when relying on other heating methods (microwave, heat gun, etc.), the mat includes a porous, melt-bonded polyester that is non-woven and has proven dimensional stability.

In various embodiments, the reactivatable tile bonding mat includes low-melting point polymer or synthetic material impregnated with metal flake or fiber, powdered steel or a steel screen mesh. For example, the tile would be placed on the mat as previously described and bonded by heating the polymer mat to the tile using convection heat, microwave heat, or an industrial heat gun. In further embodiments, once the tilemat is properly positioned, an induction heater could be passed over the top of the tile to melt the mat and form a bond between the floor and the tile. The induction heater may look like a floor buffing machine that generates a high frequency alternating current. The current would inductively couple with the steel screen or fiber, setting up an alternating current flow through the metal impregnated mat. In various instances, the mat would resistively heat and form a permanent bond with the tile and the floor. The induction heater could also be used to re-melt the mat and loosen the tile.

At step 120, upon the tiles fully bonding to the reactivatable tile bonding mat, spacers may be removed and a suitable grout may be applied between the sides of the tiles. In some cases, the grout may be an epoxy grout or a cementitious grout.

Figure 2:
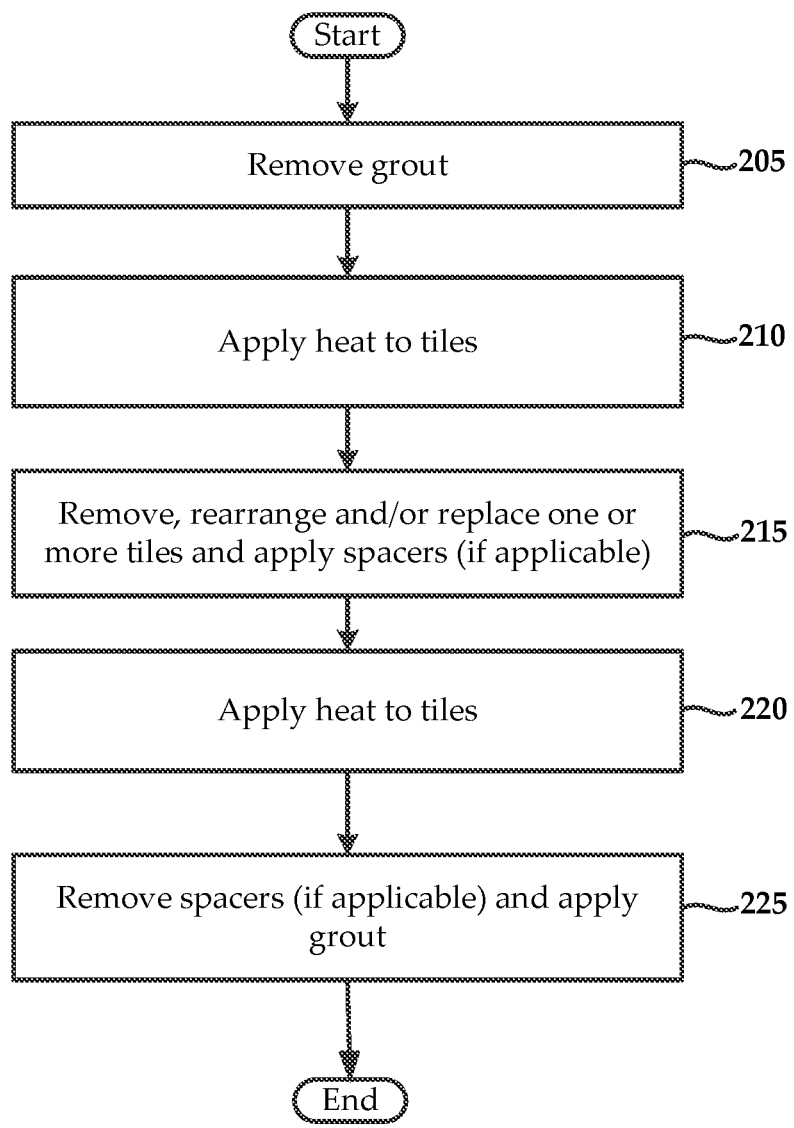
FIG. 2 illustrates an exemplary method for removing, replacing or rearranging tile or stone using a reactivatable tile bonding mat.

FIG. 2 illustrates an exemplary method for replacing, removing or rearranging tile or stone using a reactivatable tile bonding mat. This process can be conducted numerous times with no deterioration of the performance.

At step 205, the grout installed at step 120 (FIG. 1) is removed by any suitable grout removing means.

At step 210, due to the polymer hot-melt material being reactivatable, a subsequent application of induction or other heat to the upper surface of the tiles will soften the surface of the bonding mat under the tiles.

At step 215, the tiles may be removed, rearranged and/or replaced upon the reactivatable tile bonding mat, in some cases aided by the use of spacers between the sides of the tiles.

At step 220, induction, or some other method of heat, is applied to the upper surfaces of the tiles, as described at step 115 (FIG. 1).

At step 225, upon the tiles fully bonding to the reactivatable tile bonding mat, spacers may be removed and a suitable grout may be applied between the sides of the tiles, as described at step 120 (FIG. 1)

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method of installing porcelain or ceramic tiles or stones using a reactivatable tile bonding mat, the reactivatable tile bonding mat having adhesive and abhesive properties activated after heating on a top surface and on a bottom surface, the method comprising:

placing a reactivatable tile bonding mat on a flat surface, the reactivatable tile bonding mat having adhesive and abhesive properties on a top surface and on a bottom surface;

placing porcelain or ceramic tiles or stones on the reactivatable tile bonding mat, the reactivatable tile bonding mat having the adhesive and abhesive properties on the top surface and on the bottom surface;

applying heat to the porcelain or ceramic tiles or stones on the reactivatable tile bonding mat, the reactivatable tile bonding mat having the adhesive properties on the top surface and on the bottom surface activated after the applying of the heat to bond to the porcelain or ceramic tiles or stones and the flat surface, respectively; and applying grout between sides of the porcelain or ceramic tiles or stones;

wherein the reactivatable tile bonding mat includes a low-melting point polymer or synthetic material impregnated with a heat receptor comprising metal flake or fiber, or powdered steel.

2. The method of claim 1, further comprising applying spacers between the sides of the porcelain or ceramic tiles or stones prior to the applying of the heat.

3. The method of claim 2, further comprising removing the spacers between the sides of the porcelain or ceramic tiles or stones prior to the applying of the grout.

4. The method of claim 3, further comprising not using cement-based thinset.

5. The method of claim 4, wherein the reactivatable tile bonding mat comprises: an adhesive, wherein the applying heat stirs up molecules involving the heat receptor causing the adhesive to melt and bond to a floor that comprises the flat surface and the porcelain or ceramic tiles or stones.

6. The method of claim 5, further comprising utilizing polyethylene terephthalate ("PET") plastic as a base for the reactivatable tile bonding mat.

7. The method of claim 5, further comprising utilizing polyethylene terephthalate ("PET") plastic as a heat regulator or stabilizer.

8. The method of claim 7, further comprising utilizing ground windshield glass as a component of the polyethylene terephthalate ("PET") plastic.

9. The method of claim 8, wherein the reactivatable tile bonding mat further comprises a hydrophobic material, the hydrophobic material making the reactivatable tile bonding mat further act as a moisture resistant membrane and as a crack suppressant membrane.

10. The method of claim 8, wherein the ground windshield glass comprises approximately 20-50% by volume of the PET.

11. The method of claim 7, further comprising utilizing glass filler as a component of the polyethylene terephthalate ("PET") plastic.

12. The method of claim 11, further comprising utilizing the polyethylene terephthalate ("PET") plastic in grout lines of the tile.

13. The method of claim 12, further comprising utilizing an industrial heat gun to install the polyethylene terephthalate ("PET") plastic in the grout lines of the tile.

14. The method of claim 1, further comprising applying convection heat.

15. A method for replacing, removing or rearranging porcelain or ceramic tiles or stones using a reactivatable tile bonding mat, the reactivatable tile bonding mat having adhesive and abhesive properties activated after heating on a top surface and on a bottom surface, the method comprising:

removing grout between sides of porcelain or ceramic tiles or stones;

applying heat to the porcelain or ceramic tiles or stones on a reactivatable tile bonding mat, the reactivatable tile bonding mat having abhesive properties on a top surface and on a bottom surface activated after applying the heat;

replacing, removing or rearranging the porcelain or ceramic tiles or stones on the reactivatable tile bonding mat, the reactivatable tile bonding mat having the adhesive and abhesive properties on the top surface and on the bottom surface;

applying heat to the altered porcelain or ceramic tiles or stones on the reactivatable tile bonding mat, the reactivatable tile bonding mat having the adhesive properties on the top surface and on the bottom surface activated after the applying of the heat to bond to the altered porcelain or ceramic tiles or stones; and applying grout in joints between the sides of the altered porcelain or ceramic tiles or stones;

wherein the reactivatable tile bonding mat includes a low-melting point polymer or synthetic material impregnated with a heat receptor comprising metal flake or fiber, or powdered steel.

* * * * *